US012713323B2

(12) United States Patent
Cui

(10) Patent No.: US 12,713,323 B2
(45) Date of Patent: Aug. 18, 2026

(54) RESOURCE RESELECTION METHOD AND DEVICE IN WIRELESS COMMUNICATION FOR VEHICLE

(71) Applicant: Samsung Electronics Co., Ltd., Suwon-si (KR)

(72) Inventor: Lei Cui, Jiangsu Province (CN)

(73) Assignee: Samsung Electronics Co., LTD., Gyeonggi-Do (KR)

( * ) Notice: Subject to any disclaimer, the term of this patent is extended or adjusted under 35 U.S.C. 154(b) by 231 days.

(21) Appl. No.: 18/612,188

(22) Filed: Mar. 21, 2024

(65) Prior Publication Data

US 2024/0323796 A1 Sep. 26, 2024

(30) Foreign Application Priority Data

Mar. 24, 2023 (CN) ........................ 202310301296.X

(51) Int. Cl.
*H04W 36/32* (2009.01)
*H04W 36/24* (2009.01)

(52) U.S. Cl.
CPC ....... *H04W 36/324* (2023.05); *H04W 36/249* (2023.05)

(58) Field of Classification Search
CPC . H04W 36/324; H04W 36/249; H04W 36/06; H04W 4/40; H04W 36/32; Y02D 30/70
USPC .......................................................... 455/441
See application file for complete search history.

(56) References Cited

U.S. PATENT DOCUMENTS

| | | | | |
|---|---|---|---|---|
| 10,616,927 | B2 | 4/2020 | Lee et al. | |
| 10,757,550 | B2 | 8/2020 | Lee et al. | |
| 11,317,319 | B2 | 4/2022 | Li et al. | |
| 11,343,662 | B2 | 5/2022 | Tang | |
| 11,800,490 | B2 | 10/2023 | Freda et al. | |
| 2009/0247161 | A1* | 10/2009 | Pani | H04W 36/0072 455/435.3 |
| 2015/0208301 | A1* | 7/2015 | Ueda | H04W 36/04 455/444 |

(Continued)

FOREIGN PATENT DOCUMENTS

| | | | |
|---|---|---|---|
| CN | 108024230 | A | 5/2018 |
| CN | 110741708 | A | 1/2020 |

(Continued)

OTHER PUBLICATIONS

Chinese Office Action dated Aug. 6, 2025 for corresponding Chinese Patent Application No. 202310301296.X.

(Continued)

*Primary Examiner* — Don N Vo
(74) *Attorney, Agent, or Firm* — Harness, Dickey & Pierce, P.L.C.

(57) ABSTRACT

The present disclosure relates to a resource reselection method in wireless communication for a vehicle, and a device for performing the resource reselection method. The resource reselection method includes acquiring a vehicle speed, setting at least one timer based on the vehicle speed, performing a random number decision to obtain a determination result, the determination result being indicative of whether a reselection mode is to be entered, and performing resource reselection based on the determination result, the vehicle speed, and state information of the at least one timer.

15 Claims, 6 Drawing Sheets

(56) References Cited

U.S. PATENT DOCUMENTS

| | | | | |
|---|---|---|---|---|
| 2017/0064605 | A1* | 3/2017 | Wang | H04W 76/18 |
| 2018/0352508 | A1* | 12/2018 | Fujishiro | H04W 76/10 |
| 2020/0154440 | A1 | 5/2020 | Gholmieh et al. | |
| 2022/0150776 | A1* | 5/2022 | Lee | H04W 48/20 |
| 2023/0276318 | A1* | 8/2023 | Wei | H04W 72/56<br>370/329 |

FOREIGN PATENT DOCUMENTS

| | | | |
|---|---|---|---|
| CN | 112703801 | A | 4/2021 |
| KR | 10-2022-0055501 | A | 5/2022 |

OTHER PUBLICATIONS

3GPP 36.321 V16.7.0 (May 2022), LTE; Evolved Universal Terrestrial Radio Access (E-UTRA); Medium Access Control (MAC) protocol specification.

3GPP 36.321 V17.0.0 (May 2022), LTE; Evolved Universal Terrestrial Radio Access (E-UTRA); Medium Access Control (MAC) protocol specification.

* cited by examiner

RESOURCE RESELECTION METHOD AND DEVICE IN WIRELESS COMMUNICATION FOR VEHICLE

CROSS-REFERENCE TO RELATED APPLICATIONS

This U.S. non-provisional patent application claims priority under 35 U.S.C. § 119 to Chinese Patent Application No. 202310301296.X, filed on Mar. 24, 2023, in the Chinese Intellectual Property office, the entire contents of which are hereby incorporated by reference.

TECHNICAL FIELD

The present disclosure relates to a field of vehicle networking technology. More specifically, the present disclosure relates to a resource reselection method and a device in wireless communication for a vehicle.

BACKGROUND

According to 3$^{rd}$ Generation Partnership Project (3GPP) Vehicle-to-Everything (V2X) physical layer protocol, a vehicle senses an available resource set according to a sensing algorithm, and the vehicle randomly selects a time-frequency resource in the available resource set for data transmission. After the resource selection, according to 3GPP V2X Media Access Control (MAC) layer protocol, a counter will be maintained. Each time after the data is transmitted by using the selected reserved SPS resource, the counter performs a minus 1 (e.g., decrement) operation. When the counter reaches a termination condition, it performs a random number judgment, and if a random number is greater than probResourceKeep (a pre-configured or alternatively, given parameter for mode4), a new round of resource reselection will be performed, otherwise, the previous reserved resource will continue to be used.

It may be seen that the vehicle may perform physical resource selection based on the sensing algorithm itself. But as the vehicle moves, the surroundings of the vehicle will change. Therefore, the selected resource for data transmission may only be used effectively for a period of time. After that, data collisions of transmissions via the resource become excessive.

SUMMARY

Embodiments of the present disclosure lie in providing a resource reselection method and device in wireless communication for a vehicle, to improve the accuracy of the timing of resource reselection.

According to embodiments of the present disclosure, a resource reselection method in wireless communication for a vehicle is provided, the resource reselection method includes: acquiring a vehicle speed, setting at least one timer based on the vehicle speed, performing a random number decision to obtain a determination result, the determination result being indicative of whether a reselection mode is to be entered, and performing resource reselection based on the determination result, the vehicle speed, and state information of the at least one timer.

Alternatively or additionally, the performing resource reselection based on the determination result, the vehicle speed, and the state information of the at least one timer includes performing the resource reselection based on the vehicle speed, the state information of the at least one timer and a busyness rate of a data transmission channel in response to the determination result indicating that the reselection mode is to be entered, and performing the resource reselection based on the state information of the at least one timer and a determination to perform the resource reselection, the determination to perform the resource reselection being based on the vehicle speed, and the determination to perform the resource reselection being performed in response to the determination result indicating that the reselection mode is not to be entered.

Alternatively or additionally, the at least one timer includes a first timer, the setting the at least one timer based on the vehicle speed includes turning off the first timer when the vehicle speed is greater than a first threshold, and the performing resource reselection based on the vehicle speed, the state information of the at least one timer and a busyness rate of the data transmission channel includes performing the resource reselection in response to determining the vehicle speed is greater than a second threshold, performing the resource reselection when the first timer expires in response to determining the vehicle speed is less than the first threshold and the busyness rate is greater than a value, the determining whether the vehicle speed is less than the first threshold and whether the busyness rate is greater than the value being performed in response to determining the vehicle speed is not greater than the second threshold, and performing the resource reselection in response to determining the vehicle speed is not less than the first threshold or the busyness rate is not greater than the value.

Alternatively or additionally, the at least one timer includes a second timer, the setting the at least one timer based on the vehicle speed includes turning off the second timer when the vehicle speed is not greater than the second threshold, the determination to perform the resource reselection includes determining to perform the resource reselection based on the vehicle speed being greater than the second threshold, and the performing the resource reselection based on the state information of the at least one timer and the determination to perform the resource reselection includes performing the resource reselection when the second timer expires.

Alternatively or additionally, the performing the resource reselection when the second timer expires includes determining whether the second timer is running, setting the second timer to run in response to determining that the second timer is not running, and performing the resource reselection when the second timer expires.

Alternatively or additionally, the performing the resource reselection when the first timer expires includes determining whether the first timer is running, setting the first timer to run in response to determining that the first timer is not running, and performing the resource reselection when the first timer expires.

Alternatively or additionally, the performing the random number decision includes generating a random number, and comparing the random number with a parameter value to obtain a random number decision result, and the method further includes increasing the parameter value in response to the vehicle speed being less than a first threshold and a busyness rate of a data transmission channel being greater than a value, the increasing being performed before the performing the random number decision, and reducing the parameter value in response to the vehicle speed being greater than the first threshold, the reducing being performed before the performing the random number decision.

Alternatively or additionally, the vehicle speed may be an average driving speed of the vehicle within a predetermined or alternatively, given time.

According to embodiments of the present disclosure, a resource reselection device in wireless communication for a vehicle is provided, the resource reselection device includes processing circuitry configured to acquire a vehicle speed, set at least one timer based on the vehicle speed, perform a random number decision to obtain a determination result, the determination result being indicative of whether a reselection mode is to be entered, and perform resource reselection based on the determination result, the vehicle speed, and state information of the at least one timer.

According to embodiments of the present disclosure, a resource reselection device in wireless communication for a vehicle is provided, the resource reselection device includes: a speed acquiring unit, configured to acquire a vehicle speed; a timer setting unit, configured to set at least one timer based on the vehicle speed; a mode determining unit, configured to perform random number decision, and obtain a determination result by determining, based on a result of the random number decision, whether to enter a reselection mode; and a reselection performing unit, configured to perform the resource reselection based on the determination result, the vehicle speed, and state information of the at least one timer.

Alternatively or additionally, the reselection performing unit may be configured to perform the resource reselection based on the vehicle speed, the state information of the at least one timer and a busy rate of the data transmission channel, in a case that it is determined to enter a reselection mode, to determine, based on the vehicle speed, whether to perform the resource reselection, in a case that it is determined not to enter a reselection mode, and to perform the resource reselection based on the state information of the at least one timer, when it is determined to perform the resource reselection.

Alternatively or additionally, the at least one timer includes a first timer, wherein the timer setting unit may be configured to stop the first timer when the vehicle speed is greater than a first threshold, wherein the reselection performing unit may be configured to perform the resource reselection when the vehicle speed is greater than a second threshold, to determine whether the vehicle speed is less than the first threshold and whether the channel busyness rate is greater than a preset or alternatively, given value, when the vehicle speed is not greater than the second threshold, to perform the resource reselection while the first timer expires, when the vehicle speed is less than the first threshold and the channel busyness rate is greater than a preset or alternatively, given value, and to perform the resource reselection when the vehicle speed is not less than the first threshold and/or the channel busyness rate is not greater than a preset or alternatively, given value.

Alternatively or additionally, the at least one timer further includes a second timer, wherein the timer setting unit may be configured to stop the second timer when the vehicle speed is not greater than the second threshold, wherein the reselection performing unit may be configured to determine whether the vehicle speed is greater than the second threshold, to determine not to perform the resource reselection, when the vehicle speed is not greater than the second threshold, to determine to perform the resource reselection, when the vehicle speed is greater than the second threshold, and to perform the resource reselection while the second timer expires, when it is determined to perform the resource reselection.

Alternatively or additionally, the reselection performing unit may be configured to determine whether the second timer is running, to set the second timer to run in a case that the second timer is not running, and to perform the resource reselection while the second timer expires.

Alternatively or additionally, the reselection performing unit may be configured to determine whether the first timer is running, to set the first timer to run in a case that the first timer is not running, and to perform the resource reselection while the first timer expires.

Alternatively or additionally, the mode determining unit may be configured to generate a random number, to compare the random number with a predetermined or alternatively, given parameter value, and using the comparison result as a random number decision result, wherein the device further includes a parameter value updating unit, configured to increase the predetermined or alternatively, given parameter value when the vehicle speed is less than a first threshold and a channel busyness rate is greater than a preset or alternatively, given value, and to reduce the predetermined or alternatively, given parameter value when the vehicle speed is greater than the first threshold.

Alternatively or additionally, the vehicle speed may be an average driving speed of the vehicle within a predetermined or alternatively, given time.

According to embodiments of the present disclosure, a computer-readable storage medium storing a computer program that, when executed by at least one processor, causes the at least one processor to perform a resource reselection method in wireless communication for a vehicle, the method including acquiring a vehicle speed, setting at least one timer based on the vehicle speed, performing a random number decision to obtain a determination result, the determination result being indicative of whether a reselection mode is to be entered, and performing resource reselection based on the determination result, the vehicle speed, and state information of the at least one timer.

According to embodiments of the present disclosure, a computing device is provided, the computing device includes: at least one processor, and a storage storing a computer program that, when executed by the at least one processor, causes the at least one processor to perform a resource reselection method in wireless communication for a vehicle, the method including acquiring a vehicle speed, setting at least one timer based on the vehicle speed, performing a random number decision to obtain a determination result, the determination result being indicative of whether a reselection mode is to be entered, and performing resource reselection based on the determination result, the vehicle speed, and state information of the at least one timer.

According to embodiments of the present disclosure, a computer program product may be provided, instructions in the computer program product may be executed by the processor of the computer device to complete the resource reselection method in wireless communication for a vehicle according to embodiments of the present disclosure.

The resource reselection method and device in wireless communication for a vehicle according to embodiments of the present disclosure, by acquiring a vehicle speed; setting at least one timer based on the vehicle speed; performing random number decision, and obtaining a determination result by determining, based on a result of the random number decision, whether to enter a reselection mode; and performing resource reselection based on the determination result, the vehicle speed, and state information of the at least one timer, a performance improvement of the resource reselection is achieved, and then the data transmission efficiency of the vehicle is improved.

Another aspect and/or advantage of the general concept of the present disclosure will be partly explained in the following descriptions, and in part, will be clear through the descriptions, or may be learned through the practice of the general concept of the present disclosure.

BRIEF DESCRIPTION

The above and other features of embodiments of the present disclosure will become clearer, from the descriptions in combination with the accompanying drawings below, which exemplarily illustrate embodiments, and in which.

DETAILED DESCRIPTION

Figure 1:
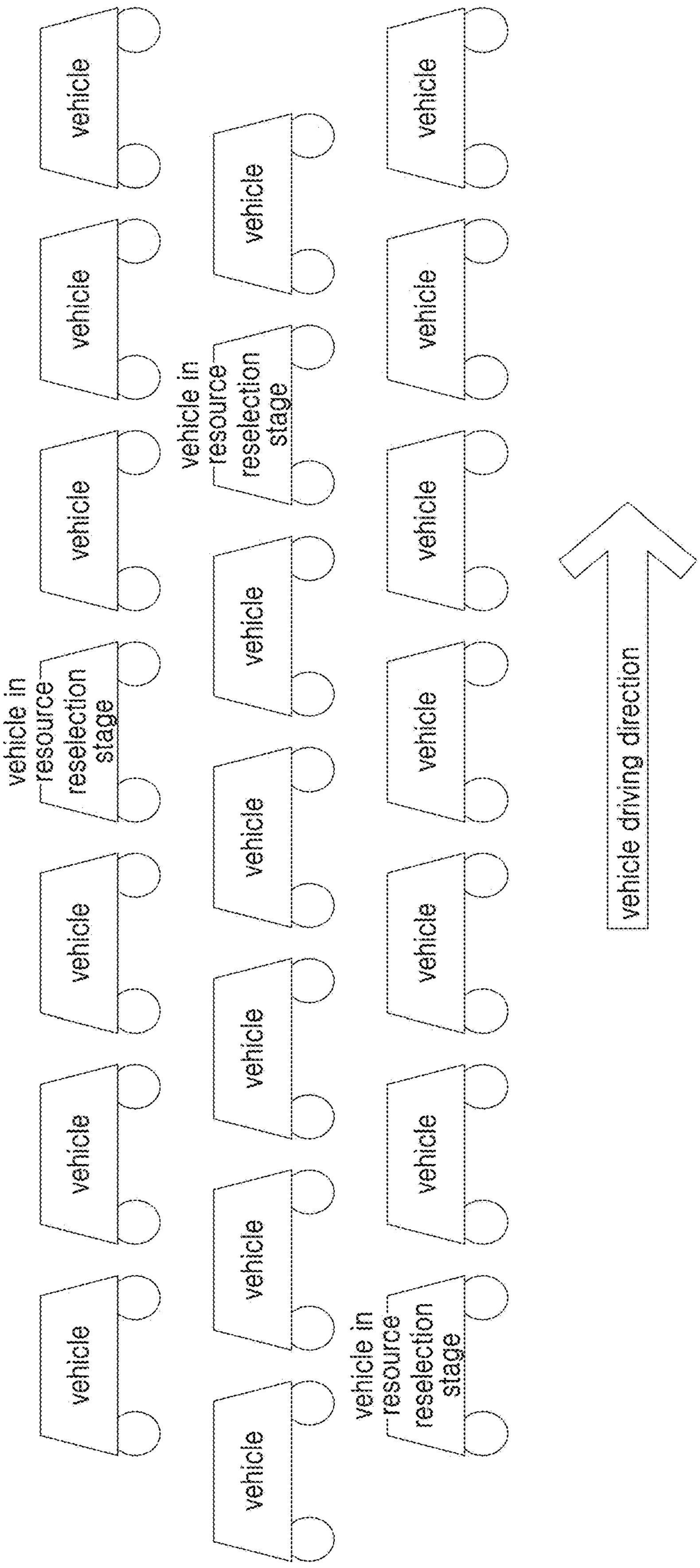
FIG. 1 shows an illustration of a driving vehicle when the road is congested.

Embodiments of the present disclosure, examples of which are illustrated in the accompanying drawings will now be referred to in detail, wherein like reference numerals indicates like parts throughout the accompany drawings. Embodiments will be illustrated below with reference to the accompanying drawings, so as to explain the present disclosure.

Figure 2:
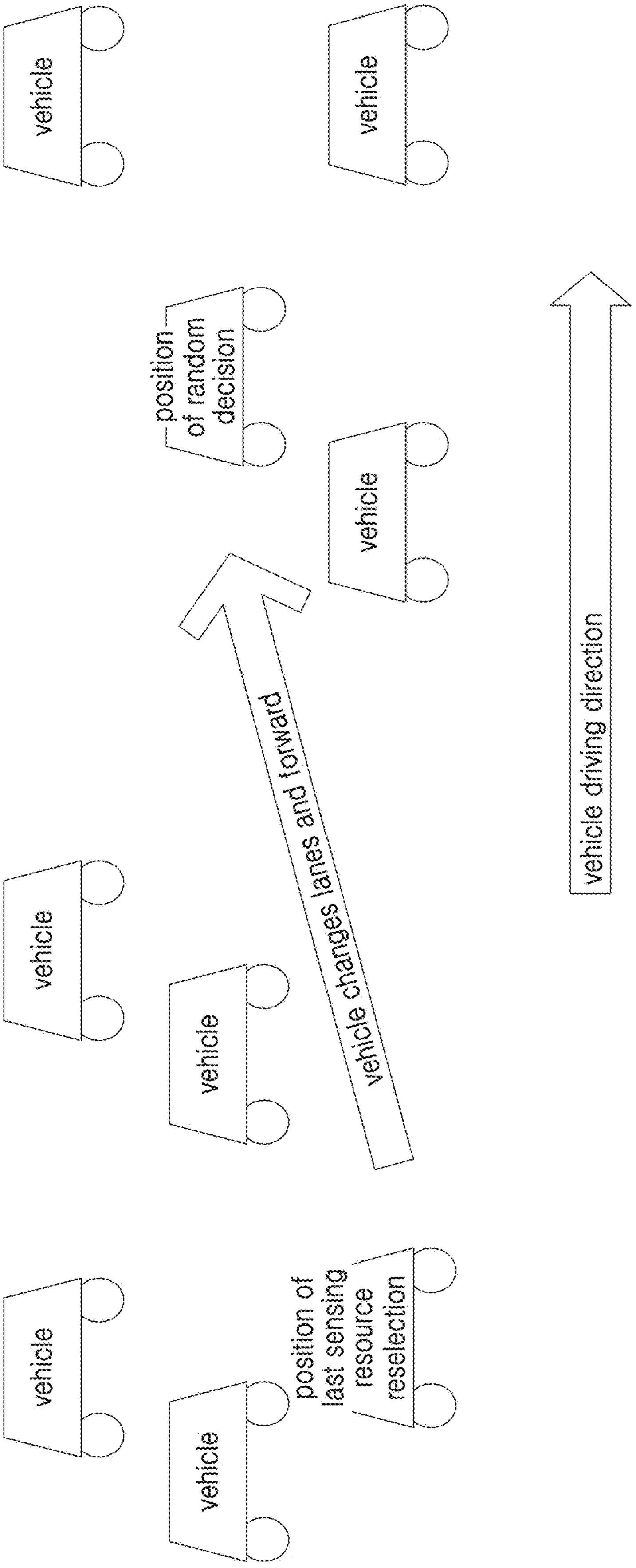
FIG. 2 shows an illustration of a high speed driving of a vehicle.

In related art, the actual driving environment of a vehicle is not considered when a communication resource (e.g., time-frequency resources) is reselected, which will bring certain drawbacks. Herein, a target resource determined by resource reselection is a resource used for data transmission by the vehicle. FIG. 1 illustrates shows an illustration of a driving vehicle when the road is congested. FIG. 2 illustrates an illustration of high speed driving of a vehicle. First, if a vehicle is currently driving on a congested road, as shown in FIG. 1, the driving environment of the vehicle does not change significantly, and accordingly at this time, it may not be useful to perform resource reselection frequently, and even if after a random selection decision it is decided to reselect the communication resource (also referred to herein as "the resource"), this reselection is unlikely to yield reselection gains but will increase load consumption required for the resource reselection. Herein, the load consumption may be, for example, but not limited to, power consumed by the resource reselection. In another scenario, if a vehicle is in a high speed driving environment, vehicles and the environment around the vehicle will change frequently, as shown in FIG. 2. If the 3GPP V2X MAC layer protocol counter (may also be referred to herein as a reselection counter) reaches a termination condition at this time, it is still determined whether to use the previous reserved resources to send data according to a single random judgment, then it is possible that there is still no opportunity to trigger resource reselection even if there may be multiple reselection decisions (random numbers are less than or equal to a parameter probResourceKeep in the multiple decisions). Then at this time, the vehicle may be far away from a sensing environment where initial resource selection is located, resources selected by previous sensing are still used in a new environment, and collisions of data transmissions will be generated with high probability.

In the present disclosure, performance of a vehicle in resource selection is improved by taking into account a current road congestion condition and a speed of the vehicle.

Figure 3:
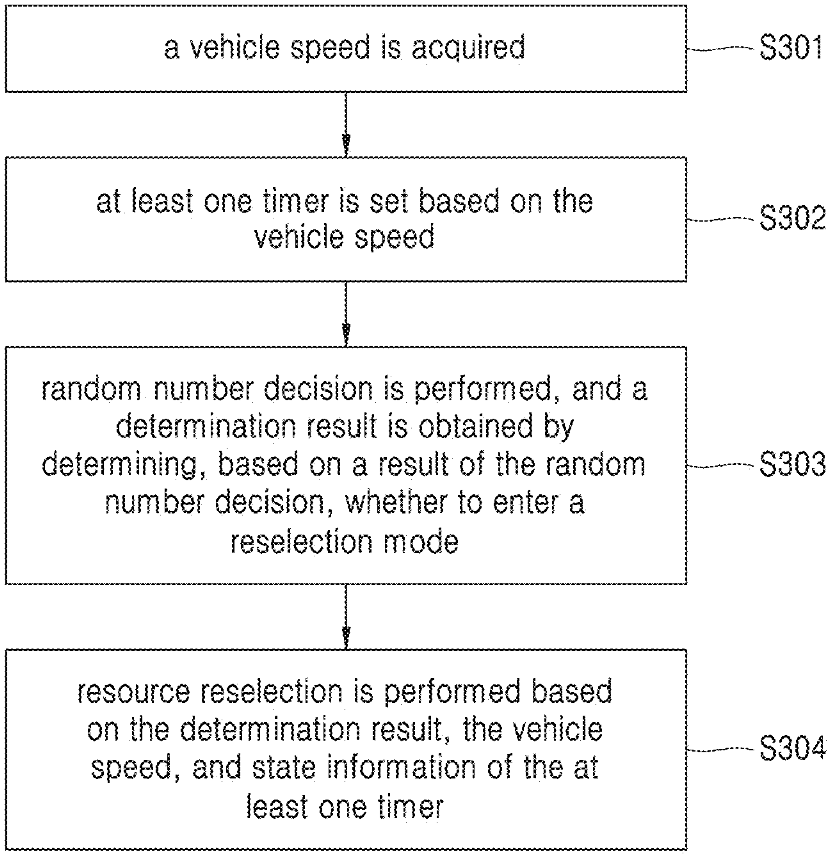
FIG. 3 illustrates a flow chart of a resource reselection method in wireless communication for a vehicle according to embodiments of the present disclosure.

FIG. 3 illustrates a flow chart of a resource reselection method in wireless communication for a vehicle according to embodiments of the present disclosure. Herein, a target resource determined by the resource reselection may be used by a communication unit of the vehicle for data transmission in a data transmission channel based on a predetermined communication protocol. The predetermined communication protocol may be any one of the communication protocols used for networking of vehicles, and the present disclosure is not limited thereto.

Referring to FIG. 3, in operation S301, a vehicle speed is acquired.

In embodiments of the present disclosure, when a resource reselection process is performed on a vehicle for use in wireless communication, the vehicle's speed is acquired first. For example, when the reselection timer reaches a termination condition, a resource reselection process is entered. According to embodiments, the vehicle's speed may be acquired from a speed sensor located on the vehicle.

In embodiments of the present disclosure, the vehicle speed may be an average driving speed of the vehicle within a predetermined or alternatively, given time. The predetermined or alternatively, given time may be, for example, but is not limited to, 1, 5, 10, 15, 20, 25, 30 minutes, etc. For example, the vehicle speed may be the average speed of the vehicle within 10 minutes.

In operation S302, at least one timer is set based on the vehicle speed.

In embodiments of the present disclosure, the at least one timer includes a first timer. In this case, when the at least one timer is set based on the vehicle speed, the first timer is stopped when the vehicle speed is greater than a first threshold.

In embodiments of the present disclosure, the at least one timer further includes a second timer. In this case, when the at least one timer is set based on the vehicle speed, the second timer is turned off when the vehicle speed is not greater than the second threshold.

For example, the second timer may be an enforcement timer, also known as an enforcement reselection timer, and the first timer may be a delay timer. The delay timer may reduce the number of reselection when the environment changes slowly and will then avoid load consumption due to the resource reselection without and will not interrupt the data transmission. The enforcement reselection timer may avoid or reduce high-probability data transmission conflict caused by long-term non-triggering resource reselection while the environment is constantly changing.

In operation S303, a random number decision is performed, and a decision result is obtained by determining, based on a result of the random number decision, whether to enter a reselection mode.

In embodiments of the present disclosure, when performing a random number decision, first, a random number (e.g., a random or pseudo random number) may be generated, and then the random number is compared with a predetermined or alternatively, given parameter value, and the comparison result is used as a random number decision result. According to embodiments, the comparison may include determining whether the random number is greater than or less than the predetermined or alternatively, given parameter value. According to embodiments, it may be determined to enter the reselection mode based on determining that the random number is greater than or equal to the predetermined or alternatively, given parameter value. According to embodiments, it may be determined to enter the reselection mode based on determining that the random number is less than or equal to the predetermined or alternatively, given parameter value.

In embodiments of the present disclosure, before the performing of random number decision, a value of a ProbResourceKeep may further be dynamically adjusted to change a probability of reselection. The predetermined or alternatively, given parameter value (for example, but not limited to, the probResourceKeep) is increased when the vehicle speed is less than the first threshold and a channel busyness rate (CBR) is greater than a preset or alternatively, given value, and the predetermined or alternatively, given parameter value is reduced when the vehicle speed is greater than the first threshold. The value of the ProbResourceKeep may be for example, but not limited to, 0, 0.2, 0.4, 0.6, 0.8, etc. . . . The channel busy ratio (CBR) measured in subframe n is defined as follows: For PSSCH, the portion of sub-channels in the resource pool whose Sidelink-Received Signal Strength Indication (S-RSSI) measured by the UE exceed a (pre-)configured threshold sensed over subframes [n−100, n−1]; For PSCCH, in a pool (pre-)configured such that PSCCH may be transmitted with its corresponding PSSCH in non-adjacent resource blocks, the portion of the resources of the PSCCH pool whose S-RSSI measured by the UE exceed a (pre-)configured threshold sensed over subframes [n−100, n−1], assuming that the PSCCH pool is composed of resources with a size of two consecutive PRB pairs in the frequency domain. The channel busy rate may be calculated or measured by any method and the present disclosure does not limit thereto.

As an example, according to a judgment condition, if the probResourceKeep is increased, the probability of reselection will be decreased; and if the probResourceKeep is decreased, the probability of reselection will be increased. For example, for a vehicle in congested road situation, the probResourceKeep may be dynamically increased so that frequently resource reselection may be suppressed; for a vehicle in high speed road situation for which the surrounding conditions change rapidly, the probResourceKeep may be decreased so that resource reselection may be triggered with high possibility.

In operation S304, resource reselection is performed based on the determination result, the vehicle speed, and state information of the at least one timer.

In embodiments of the present disclosure, when the resource reselection is performed based on the determination result, the vehicle speed, and state information of the at least one timer, in a case that it is determined to enter a reselection mode, the resource reselection may be performed based on the vehicle speed, the state information of the at least one timer and a busy rate of the data transmission channel. According to embodiments, through the data transmission channel, information may be transmitted in various multiple access schemes, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), OFDM-FDMA, OFDM-TDMA, and OFDM-CDMA.

In embodiments of the present disclosure, in the case that it is determined to enter the reselection mode, when the resource reselection is performed based on the vehicle speed, the state information of the at least one timer and a busy rate of the data transmission channel, the resource reselection may be performed when the vehicle speed is greater than a second threshold.

In embodiments of the present disclosure, in the case that it is determined to enter the reselection mode, when resource reselection is performed based on the vehicle speed, the state information of the at least one timer and a busyness rate of the data transmission channel, whether the vehicle speed is less than the first threshold and whether the channel busyness rate is greater than a preset or alternatively, given value may be determined when the vehicle speed is not greater than the second threshold, and the resource reselection is performed while the first timer expires, when the vehicle speed is less than the first threshold and the channel busyness rate is greater than a preset or alternatively, given value.

In embodiments of the present disclosure, when the resource reselection is performed while (or when) the first timer expires, first, whether the first timer is running may be determined, then the first timer may be set to run in a case in which the first timer is not running, and the resource reselection may be performed while (or when) the first timer expires.

In embodiments of the present disclosure, when the resource reselection is performed based on the vehicle speed, the state information of the at least one timer and a busy rate of the data transmission channel, the resource reselection may be performed when the vehicle speed is not less than the first threshold and/or the channel busyness rate is not greater than a preset or alternatively, given value.

As an example, for the challenge encountered by a vehicle driving at a low speed on a congested road in FIG. 1, first, a channel busyness rate (CBR) decision threshold CBR_Thresh_H (high) is set. When the vehicle performs resource reselection, the channel busyness rate (CBR) and the vehicle speed are taken into account. If the current channel busyness rate (CBR) is greater than the CBR_Thresh_H (high), and the vehicle speed is slow, the vehicle is considered to be in a state of road congestion, so even if it is determined, by the random selection, that reselection is to be performed, the vehicle may override this determination to perform the resource reselection immediately (or promptly). At this time, a delay time may be set (for example, through the delay reselection timer T1). Before the delay time, the vehicle continues to use a previously reserved resource to send data, and then performs resource reselection after the delay time, so as to avoid or reduce the load consumption caused by frequent resource reselection when the vehicle is slowly driving in a congested road environment.

As another example, for the challenge encountered in FIG. 2, if the current vehicle is driving at a high speed, an enforced reselection time may be set (for example, by the forced reselection timer T2), and the enforcement reselection timer T2 may be started if it is determined, by the random selection, that it may not be advantageous for the vehicle to reselect the resource. If the vehicle reselects a new resource after the random decision, the timer is turned off. If the timer expires, it means that the resource has not been reselected for a long time, then the resource reselection is enforced to be executed, so as to avoid or reduce a high probability of data transmission collision caused by a significant difference between the current environment and the environment in which the resource was selected.

In embodiments of the present disclosure, when resource reselection is performed based on the determination result, the vehicle speed, and the state information of the at least one timer, whether to perform the resource reselection may be determined based on the vehicle speed, in a case that it is determined not to enter a reselection mode, and the resource reselection is performed based on the state information of the at least one timer, when it is determined to perform the resource reselection.

In embodiments of the present disclosure, when it is determined based on the vehicle speed, whether to perform the resource reselection, in a case that it is determined not to enter a reselection mode, first, whether the vehicle speed is greater than the second threshold may be determined, then it is determined not to perform the resource reselection when the vehicle speed is not greater than the second threshold, and it is determined to perform the resource reselection when the vehicle speed is greater than the second threshold. In embodiments of the present disclosure, if it is determined to perform the resource reselection, when the resource reselection is performed based on the state information of the at least one timer, resource reselection is performed while the second timer expires.

In embodiments of the present disclosure, when the resource reselection is performed while (or when) the second timer expires, first, whether the second timer is running may be determined, then the second timer is set to run in a case that the second timer is not running, and the resource reselection is performed while (or when) the second timer expires.

Figure 4:
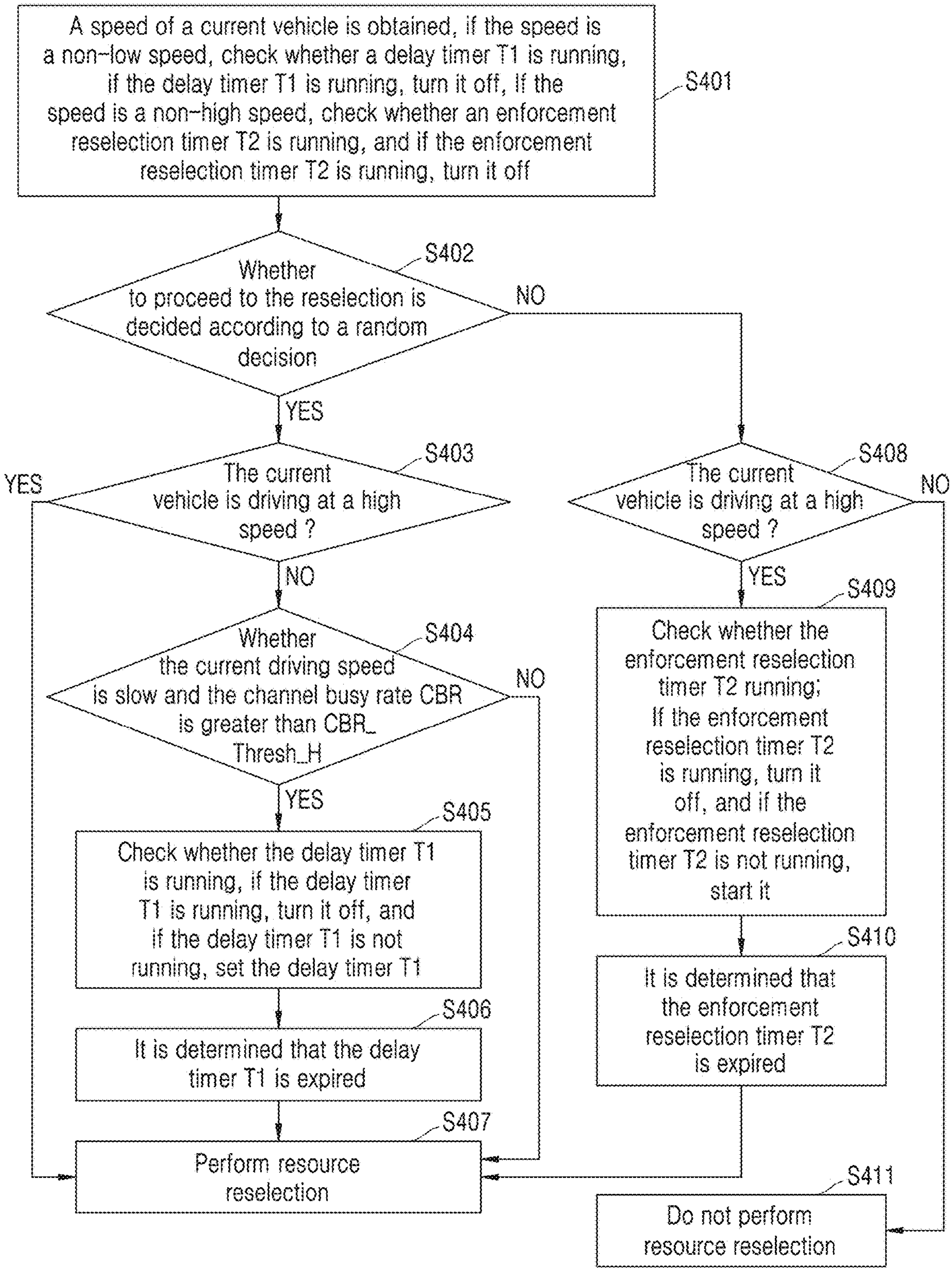
FIG. 4 illustrates a schematic diagram of resource reselection in wireless communication for a vehicle according to embodiments of the present disclosure.

FIG. 4 illustrates a schematic diagram of resource reselection in wireless communication for a vehicle according to embodiments of the present disclosure.

As shown in FIG. 4, when the reselection counter (e.g., timer) reaches a termination condition, operation S401 is entered. In operation S401, first, a speed (for example, the average speed) of a current vehicle may be acquired. If the speed is a non-low speed, a check may be performed to ensure that there is no delay timer T1 running. If there is a running delay timer T1, it may be turned off. If the driving speed is a non-high speed, a check may be performed to ensure that there is currently no enforcement reselection timer T2 running, if there is a running enforcement reselection timer T2, it may be turned off. Then, at operation S402, a random decision is made to decide whether to proceed to the reselection. If YES, at operation S403, it is determined whether the current vehicle is driving at a high speed. In operation S404, it is determined whether the current driving speed is slow and the channel busyness rate (CBR) is greater than CBR_Thresh_H. For the case where the current driving speed is slow and the channel busyness rate (CBR) is greater than CBR_Thresh_H, in operation S405, it is determined whether the delay timer T1 is running. If there is no delay timer T1 running at present, the delay timer T1 may be set. In operation S406, it is determined whether the delay timer T1 is expired, and only when the delay timer T1 is expired, the resource reselection may be triggered to be performed in operation S407. Operation S407 is performed for normal reselection in other cases, i.e., a case where the current driving speed is slow but the channel busyness rate (CBR) is not greater than CBR_Thresh_H, a case where the current driving speed is fast. It will be understood, however, that according to embodiments, operation S407 may also be performed if the "Yes" branch of operation S403 or the "No" branch of operation S404 is satisfied, or following operation S410 as discussed further below. If it is determined not to perform reselection after a random decision, in operation S408, it is determined whether the current vehicle is driving at a high speed. In a case of high speed driving, in operation S409, it is checked whether there is an enforcement reselection timer T2 running. If there is no running enforcement reselection timer, the enforcement reselection timer T2 may be started. In operation S410, it is determined whether the enforcement reselection timer T2 is expired. When the enforcement reselection timer T2 is expired, operation S407 may be performed to start the reselection. In other cases, the resource reselection is not performed in operation S411.

The resource reselection method in wireless communication for a vehicle according to embodiments of the present disclosure, may improve the performance of the resource reselection algorithm, thereby improving the data transmission efficiency of the vehicle.

In addition, according to embodiments of the present disclosure, a computer readable storage medium stored with a computer program is provided. When the computer program is executed, the resource reselection method in wireless communication for a vehicle according to embodiments of the present disclosure is implemented.

In embodiments of the present disclosure, the computer readable storage medium may carry one or more programs that, when executed, the following operations may be implemented: acquiring a vehicle speed; setting at least one timer based on the vehicle speed; performing random number decision, and obtaining a determination result by determining, based on a result of the random number decision, whether to enter a reselection mode; and performing resource reselection based on the determination result, the vehicle speed, and state information of the at least one timer.

The computer readable storage medium may be, for example, but not limited to, an electronic, magnetic, optical, electromagnetic, infrared, or semiconductor system, device, or, equipment or any combination of the above. More specific examples of computer readable storage media may include, but not limited to, electrical connections having one or more wires, portable computer disks, hard disks, random access memory (RAM), read only memory (ROM), erasable Programmable read only memory (EPROM or flash memory), optical fiber, portable compact disk read only memory (CD-ROM), optical storage device, magnetic storage device, or any suitable combination of the above mentioned. In embodiments of the present disclosure, a computer readable storage medium may be any tangible medium that may contain or store a computer program, which may be used by or in connection with an instruction execution system, device, or, equipment. The computer program embodied on the computer readable storage medium may be transmitted by any suitable medium, including but not limited to: wire, fiber optic cable, RF (radio frequency), etc., or any suitable combination of the foregoing. The computer readable storage medium may be included in any device; it may also be present separately and not incorporated into the device.

In addition, according to embodiments of the present disclosure, a computer program product may be provided, instructions in the computer program product may be executed by a processor of a computer device to complete the resource reselection method in wireless communication for a vehicle according to embodiments of the present disclosure.

The resource reselection method in wireless communication for a vehicle according to embodiments of the present disclosure has been described above with reference to FIGS.

1-4. Hereinafter, a resource reselection device in wireless communication for a vehicle and the units thereof according to embodiments of the present disclosure will be described with reference to FIG. 5.

Figure 5:
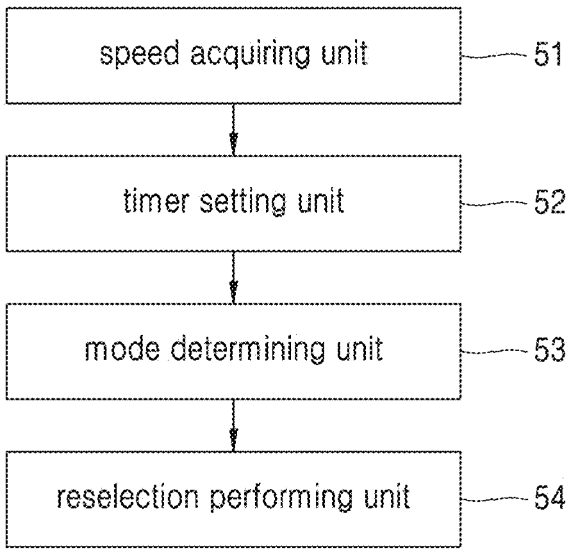
FIG. 5 illustrates a block diagram of a resource reselection device in wireless communication for a vehicle according to embodiments of the present disclosure.

FIG. 5 illustrates a block diagram of a resource reselection device in wireless communication for a vehicle according to embodiments of the present disclosure.

Referring to FIG. 5, the resource reselection device in wireless communication for the vehicle includes a speed acquiring unit 51, a timer setting unit 52, a mode determining unit 53, and/or a reselection performing unit 54.

The speed acquiring unit 51 is configured to acquire a vehicle speed.

In embodiments of the present disclosure, the vehicle speed may be an average driving speed of the vehicle within a predetermined or alternatively, given time.

The timer setting unit 52 is configured to set at least one timer based on the vehicle speed.

In embodiments of the present disclosure, the at least one timer includes a first timer. The timer setting unit 52 may be configured to turn off the first timer when the vehicle speed is greater than a first threshold.

In embodiments of the present disclosure, the at least one timer further includes a second timer. The timer setting unit 52 may be configured to stop the second timer when the vehicle speed is not greater than the second threshold.

The mode determining unit 53 is configured to perform random number decision, and obtain a determination result by determining, based on a result of the random number decision, whether to enter a reselection mode.

In embodiments of the present disclosure, the mode determining unit 53 may be configured to generate a random number, to compare the random number with a predetermined or alternatively, given parameter value, and using the comparison result as a random number decision result.

In embodiments of the present disclosure, the device may further include a parameter value updating unit (not shown) configured to increase the predetermined or alternatively, given parameter value when the vehicle speed is less than a first threshold and a channel busyness rate is greater than a preset or alternatively, given value, and to reduce the predetermined or alternatively, given parameter value when the vehicle speed is greater than the first threshold.

The reselection performing unit 54 is configured to perform the resource reselection based on the determination result, the vehicle speed, and state information of the at least one timer.

In embodiments of the present disclosure, the reselection performing unit 54 may be configured to perform the resource reselection based on the vehicle speed, the state information of the at least one timer and a busyness rate of the data transmission channel, in a case that it is determined to enter a reselection mode, and to determine, based on the vehicle speed, whether to perform the resource reselection, in a case that it is determined not to enter a reselection mode, and to perform the resource reselection based on the state information of the at least one timer, when it is determined to perform the resource reselection.

In embodiments of the present disclosure, the reselection performing unit 54 may be configured to perform the resource reselection when the vehicle speed is greater than a second threshold, to determine whether the vehicle speed is less than the first threshold and whether the channel busyness rate is greater than a preset or alternatively, given value, when the vehicle speed is not greater than the second threshold, and to perform the resource reselection while the first timer expires, when the vehicle speed is less than the first threshold and the channel busyness rate is greater than a preset or alternatively, given value.

In embodiments of the present disclosure, the reselection performing unit 54 may be further configured to perform the resource reselection when the vehicle speed is not less than the first threshold and/or the channel busyness rate is not greater than a preset or alternatively, given value.

In embodiments of the present disclosure, the reselection performing unit 54 may be configured to determine whether the vehicle speed is greater than the second threshold, to determine not to perform the resource reselection, when the vehicle speed is not greater than the second threshold, to determine to perform the resource reselection, when the vehicle speed is greater than the second threshold, and to perform the resource reselection while the second timer expires, when it is determined to perform the resource reselection.

In embodiments of the present disclosure, the reselection performing unit 54 may be configured to determine whether the second timer is running, to set the second timer to run in a case that the second timer is not running, and to perform the resource reselection while the second timer expires.

In embodiments of the present disclosure, the reselection performing unit 54 may be configured to determine whether the first timer is running, to set the first timer to run in a case that the first timer is not running, and to perform the resource reselection while the first timer expires.

The resource reselection device in wireless communication for a vehicle according to embodiments of the present disclosure has been described in conjunction with FIGS. 4-5. Next, a computing device according to embodiments of the present disclosure may be described in conjunction with FIG. 6.

Figure 6:
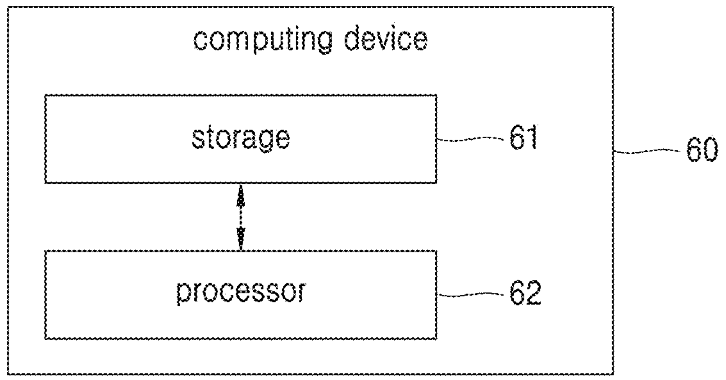
FIG. 6 illustrates a schematic diagram of a computing device according to embodiments of the present disclosure.

FIG. 6 illustrates a schematic diagram of a computing device according to embodiments of the present disclosure.

Referring to FIG. 6, a computing device 6 according to embodiments of the present disclosure includes a storage 61 (e.g., a tangible, non-transitory computer-readable medium) and/or a processor 62. The storage 61 stores a computer program thereon, and when the computer program is executed by the processor 62, the resource reselection method according to embodiments of the present disclosure is implemented.

In embodiments of the present disclosure, when the computer program is executed by the processor 62, the following operations may be implemented: acquiring a vehicle speed; setting at least one timer based on the vehicle speed; performing random number decision, and obtaining a determination result by determining, based on a result of the random number decision, whether to enter a reselection mode; and performing resource reselection based on the determination result, the vehicle speed, and state information of the at least one timer. According to embodiments, the computing device 6 may generate a communication signal, and transmit the communication signal via the reselected communication resources (e.g., time-frequency resources). For example, the computing device 6 may transmit the communication signal to another computing device and/or a base station. According to embodiments, the computing device 6 may receive a communication signal via the reselected communication resources from another computing device and/or a base station.

The computing device in the embodiments of the present disclosure may include but are not limited to devices such as a mobile phone, a laptop, a PDA (personal digital assistant), a PAD (tablet computer), a desktop computer, etc. The computing device shown in FIG. 6 is only an example, which should not bring any limitation to the function and the range of application of the embodiments of the present disclosure.

The resource reselection method and device in wireless communication for a vehicle according to embodiments of the present disclosure have been described by referring to FIGS. 1-6. However, it should be understood: the resource reselection device in wireless communication for a vehicle and units thereof shown in FIG. 5 may be respectively configured as software, hardware, firmware, or any combination of the above mentioned items performing specific functions, and the computing device shown in FIG. 6 is not limited to including the components shown above, but some components that may be added or deleted, and the above components may also be combined.

The resource reselection method and device in wireless communication for a vehicle according to embodiments of the present disclosure, by acquiring a vehicle speed; setting at least one timer based on the vehicle speed; performing random number decision, and obtaining a determination result by determining, based on a result of the random number decision, whether to enter a reselection mode; and performing resource reselection based on the determination result, the vehicle speed, and state information of the at least one timer, therefore, a performance improvement of the resource reselection is achieved, and then the data transmission efficiency of the vehicle is improved.

Conventional devices and methods for performing 3GPP V2X communication involve performance of communication resource reselection based on a period represented by a reselection counter. However, the usefulness of the selected communication resources (e.g., time-frequency resources) expires more quickly in rapidly changing environments than in slowly changing environments. Accordingly, in slowly changing environments (e.g., when a vehicle is traveling slowly), the periodic communication resource reselection performed by the conventional devices and methods results in excessive resource consumption (e.g., processor, memory, delay, power, bandwidth, etc.). Also, in rapidly changing environments (e.g., when a vehicle is traveling quickly), the periodic communication resource reselection performed by the conventional devices and methods results in decreased communication performance due to a higher probability of communication transmission collision.

However, according to embodiments, improved devices and methods are provided for performing 3GPP V2X communication. For example, the improved devices and methods override the periodic timing of communication resource reselection to decrease the occurrence of resource reselection in slowly changing environments and/or increase the occurrence of resource reselection in rapidly changing environments. Accordingly, the improved devices and methods overcome the deficiencies of the conventional devices and methods to at least reduce resource consumption in slowly changing environments and/or increase communication performance in rapidly changing environments.

According to embodiments, operations described herein as being performed by the vehicle, the resource reselection device, the speed acquiring unit 51, the timer setting unit 52, the mode determining unit 53, the reselection performing unit 54, the computing device 6 and/or the processor 62 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

According to embodiments, the operations described in association with FIGS. 3-4 may be performed by processing circuitry. Such processing circuitry may be included on the vehicle, carried inside the vehicle (e.g., in a wireless device, etc.), or outside of the vehicle (e.g., a cellular base station, etc.). Likewise, each of the resource reselection device and the computing device 6 may be included on the vehicle, carried inside the vehicle (e.g., in a wireless device, etc.), or outside of the vehicle (e.g., a cellular base station, etc.).

The various operations of methods described above may be performed by any suitable device capable of performing the operations, such as the processing circuitry discussed above. For example, as discussed above, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

Embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail herein. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, contemporaneously, or in some cases be performed in reverse order.

It will be understood that when an element is referred to as being "connected" or "coupled" to another element, it may be directly connected or coupled to the other element or intervening elements may be present. Although terms of "first" or "second" may be used to explain various components, the components are not limited to the terms. These terms should be used only to distinguish one component from another component. For example, a "first" component may be referred to as a "second" component, or similarly, and the "second" component may be referred to as the "first" component. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples. As used herein the term "and/or" includes any and all combinations of one or more of the associated listed items.

While the present disclosure has been particularly shown and described with reference to embodiments thereof, it will be understood by those skilled in the art that various changes in form and details may be made therein without departing from the spirit and scope of the present disclosure as defined by the claims.

The invention claimed is:

1. A resource reselection method in wireless communication for a vehicle, the resource reselection method comprising:

acquiring a vehicle speed;

setting at least one timer based on the vehicle speed;

performing a random number decision to obtain a determination result, the determination result being indicative of whether a reselection mode is to be entered; and performing resource reselection based on the determination result, the vehicle speed, and state information of the at least one timer.

2. The resource reselection method according to claim 1, wherein the performing resource reselection based on the determination result, the vehicle speed, and the state information of the at least one timer comprises:

performing the resource reselection based on the vehicle speed, the state information of the at least one timer and a busyness rate of a data transmission channel in response to the determination result indicating that the reselection mode is to be entered; and performing the resource reselection based on the state information of the at least one timer and a determination to perform the resource reselection, the determination to perform the resource reselection being based on the vehicle speed, and the determination to perform the resource reselection being performed in response to the determination result indicating that the reselection mode is not to be entered.

3. The resource reselection method according to claim 2, wherein the at least one timer includes a first timer;

the setting the at least one timer based on the vehicle speed includes turning off the first timer when the vehicle speed is greater than a first threshold; and the performing resource reselection based on the vehicle speed, the state information of the at least one timer and the busyness rate of the data transmission channel comprises:

performing the resource reselection in response to determining the vehicle speed is greater than a second threshold, performing the resource reselection when the first timer expires in response to determining the vehicle speed is less than the first threshold and the busyness rate is greater than a value, whether the vehicle speed is less than the first threshold and whether the busyness rate is greater than the value being determined in response to determining the vehicle speed is not greater than the second threshold, and performing the resource reselection in response to determining the vehicle speed is not less than the first threshold or the busyness rate is not greater than the value.

4. The resource reselection method of claim 3, wherein the at least one timer includes a second timer;

the setting the at least one timer based on the vehicle speed includes turning off the second timer when the vehicle speed is not greater than the second threshold;

the determination to perform the resource reselection includes determining to perform the resource reselection based on the vehicle speed being greater than the second threshold; and the performing the resource reselection based on the state information of the at least one timer and the determination to perform the resource reselection includes performing the resource reselection when the second timer expires.

5. The resource reselection method according to claim 4, wherein the performing the resource reselection when the second timer expires comprises:

determining whether the second timer is running;

setting the second timer to run in response to determining that the second timer is not running; and performing the resource reselection when the second timer expires.

6. The resource reselection method according to claim 3, wherein the performing the resource reselection when the first timer expires comprises:

determining whether the first timer is running;

setting the first timer to run in response to determining that the first timer is not running; and performing the resource reselection when the first timer expires.

7. The resource reselection method according to claim 1, wherein the performing the random number decision comprises:

generating a random number, and comparing the random number with a parameter value to obtain a random number decision result; and the resource reselection method further comprises:

increasing the parameter value in response to the vehicle speed being less than a first threshold and a busyness rate of a data transmission channel being greater than a value, the increasing being performed before the performing the random number decision, and reducing the parameter value in response to the vehicle speed being greater than the first threshold, the reducing being performed before the performing the random number decision.

8. A resource reselection device in wireless communication for a vehicle, the resource reselection device comprising:

processing circuitry configured to acquire a vehicle speed, set at least one timer based on the vehicle speed, perform a random number decision to obtain a determination result, the determination result being indicative of whether a reselection mode is to be entered, and perform resource reselection based on the determination result, the vehicle speed, and state information of the at least one timer.

9. A non-transitory computer-readable storage medium storing a computer program that, when executed by at least one processor, causes the at least one processor to perform a resource reselection method in wireless communication for a vehicle, the resource reselection method comprising:

acquiring a vehicle speed;

setting at least one timer based on the vehicle speed;

performing a random number decision to obtain a determination result, the determination result being indicative of whether a reselection mode is to be entered; and performing resource reselection based on the determination result, the vehicle speed, and state information of the at least one timer.

10. The non-transitory computer-readable storage medium according to claim 9, wherein the performing resource reselection based on the determination result, the vehicle speed, and the state information of the at least one timer comprises:

performing the resource reselection based on the vehicle speed, the state information of the at least one timer and a busyness rate of a data transmission channel in response to the determination result indicating that the reselection mode is to be entered; and performing the resource reselection based on the state information of the at least one timer and a determination to perform the resource reselection, the determination to perform the resource reselection being based on the vehicle speed, and the determination to perform the resource reselection being performed in response to the determination result indicating that the reselection mode is not to be entered.

11. The non-transitory computer-readable storage medium according to claim 10, wherein the at least one timer includes a first timer;

the setting the at least one timer based on the vehicle speed includes turning off the first timer when the vehicle speed is greater than a first threshold; and the performing resource reselection based on the vehicle speed, the state information of the at least one timer and the busyness rate of the data transmission channel comprises:

performing the resource reselection in response to determining the vehicle speed is greater than a second threshold, performing the resource reselection when the first timer expires in response to determining the vehicle speed is less than the first threshold and the busyness rate is greater than a value, whether the vehicle speed is less than the first threshold and whether the busyness rate is greater than the value being determined in response to determining the vehicle speed is not greater than the second threshold, and performing the resource reselection in response to determining the vehicle speed is not less than the first threshold or the busyness rate is not greater than the value.

12. The non-transitory computer-readable storage medium according to claim 11, wherein the at least one timer includes a second timer;

the setting the at least one timer based on the vehicle speed includes turning off the second timer when the vehicle speed is not greater than the second threshold;

the determination to perform the resource reselection includes determining to perform the resource reselection based on the vehicle speed being greater than the second threshold; and the performing the resource reselection based on the state information of the at least one timer and the determination to perform the resource reselection includes performing the resource reselection when the second timer expires.

13. The non-transitory computer-readable storage medium according to claim 12, wherein the performing the resource reselection when the second timer expires comprises:

determining whether the second timer is running;

setting the second timer to run in response to determining that the second timer is not running; and performing the resource reselection when the second timer expires.

14. The non-transitory computer-readable storage medium according to claim 11, wherein the performing the resource reselection when the first timer expires comprises:

determining whether the first timer is running;

setting the first timer to run in response to determining that the first timer is not running; and performing the resource reselection when the first timer expires.

15. The non-transitory computer-readable storage medium according to claim 9, wherein the performing the random number decision comprises:

generating a random number, and comparing the random number with a parameter value to obtain a random number decision result; and the resource reselection method further comprises:

increasing the parameter value in response to the vehicle speed being less than a first threshold and a busyness rate of a data transmission channel being greater than a value, the increasing being performed before the performing the random number decision, and reducing the parameter value in response to the vehicle speed being greater than the first threshold, the reducing being performed before the performing the random number decision.

* * * * *